United States Patent [19]
Bauer

[11] Patent Number: 6,129,316
[45] Date of Patent: Oct. 10, 2000

[54] TELECOMMUNICATIONS RACK CABLE SUPPORT BRACKET

[75] Inventor: Arthur D. Bauer, Southington, Conn.

[73] Assignee: The Siemon Company, Watertown, Conn.

[21] Appl. No.: 09/121,469

[22] Filed: Jul. 23, 1998

[51] Int. Cl.[7] ........................................................ F16L 3/22
[52] U.S. Cl. ............................................. 248/68.1; 248/49
[58] Field of Search ............................... 248/49, 68.1, 69, 248/56, 72, 73, 74.1, 74.2, 74.4

[56] References Cited

U.S. PATENT DOCUMENTS

| | | | |
|---|---|---|---|
| 3,680,817 | 8/1972 | Gogan | 248/68.1 |
| 3,791,613 | 2/1974 | Nollen | 248/49 |
| 4,960,253 | 10/1990 | Perrault et al. | 248/68.1 |
| 5,465,929 | 11/1995 | Dooley | 248/68.1 |
| 5,580,014 | 12/1996 | Rinderer | 248/49 |
| 5,639,048 | 6/1997 | Bartholomew et al. | 248/49 |

*Primary Examiner*—Ramon O. Ramirez
*Assistant Examiner*—Tan Le

*Attorney, Agent, or Firm*—Cantor Colburn LLP

[57] ABSTRACT

A telecommunications rack cable support bracket is provided which comprises a pair of parallel support members and a plurality of cross members extending therebetween. The arrangement of the support members and the cross members defines two openings through which cable may be routed. Each support member includes tabs for securely positioning the telecommunications rack cable support bracket onto a telecommunications rack by interfacing with the horizontal Z-brackets of the telecommunications rack, thus eliminating the need for the use of special mechanical fasteners. Each cross member includes a pair of downwardly extending tabs which serve to locate the telecommunications rack cable support bracket between two U-shaped brackets of the telecommunications rack. These tabs also provide stress concentration relief for cable bundles routed from U-channels across the telecommunications rack cable support bracket. Cable bundles are securely routed across the telecommunications rack cable support bracket by use of cable bundle management devices which are detachably received in openings in each cross member.

12 Claims, 4 Drawing Sheets

TELECOMMUNICATIONS RACK CABLE SUPPORT BRACKET

BACKGROUND OF THE INVENTION

1. Field of the Invention

This invention relates generally to telecommunications racks and in particular to a telecommunications rack cable support bracket for installation at the top of a telecommunications rack.

2. Brief Discussion of the Related Art

Telecommunications racks house equipment and cable and are generally used as distribution points for telecommunications cabling. Conventional top rack cable management systems typically have a ladder configuration and are distributed in a kit which comprises a number of parts for attachment to complete the entire ladder rack assembly. The ladder assembly is then mounted to the top of a telecommunications rack. One component, a cable runaway, is provided to support telecommunications cables as they travel along the top of the rack and are directed to an intended location on the rack. Angled wall brackets and additional brackets are used to mount the telecommunications management system to the top of the telecommunications rack.

Conventional top rack cable management systems typically extend beyond the dimensions of the rack itself, thus producing a management system which does not attach and sit solely along the top portion of the rack. The cable runway portion, is assembled to the telecommunications rack with the use of either mechanical fasteners or is self supported by the rest of the management system above the rack and it is common for a single ladder to have a length of about six (6) feet and the single ladder is designed to span the entire width of several telecommunications racks. Because of their size, the conventional telecommunications ladder assemblies are usually heavy and difficult to install on the racks. Generally, the ladders are placed on the racks with little or no consideration on where the rungs of the ladder are positioned in relation to the telecommunications rack and cable openings therein. Thus, a ladder rung may be positioned over vertical U-channels, which are common to telecommunications racks, and such obstruction by the ladder rung can block critical cable pathways to the rack. In addition, the ladder rungs are rectangular in cross section and provide minimal cable bend relief when the cable bundles are run over the ladder rungs. The conventional ladder top rack cable management system also does not provide cable bundle management devices for the anchoring of cable bundles which run along the ladder assembly.

Thus, there is a need for a top rack cable management system which can easily be attached to the top of a telecommunications rack without the use of fasteners and which is self locating along the top of the rack and does not block critical access to cable pathways.

SUMMARY OF THE INVENTION

An object of the present invention is to provide an effective cable management system which is compatible for positioning on the top of conventional telecommunications racks and is compatible with existing ladder assemblies.

A more specific object of the present invention is to provide a cable management system which does not require the use of any special mechanical fasteners for mounting to the top of the rack and is self locating along the top of the rack.

Another specific object of the present invention is to provide a cable management system which offers cable bend relief and cable bundle attachment features.

These and other objects and advantages of the invention are obtained and the above-discussed and other drawbacks and deficiencies of the prior art are overcome or alleviated by the telecommunications rack cable support bracket of the present invention. The telecommunications rack cable support bracket of the present invention comprises a pair of parallel support members and three parallel cross members which are preferably perpendicular to the support members. Two of the cross members are located towards the ends of the support members and a third cross member is located near the center of the support members. The arrangement of the support members and cross members defines two openings in the support bracket through which cable may be routed. Each support member includes tabs extending away from the support member at approximately 90°. These tabs are positioned within each opening of the support bracket and securely position the telecommunications rack cable support bracket onto a telecommunications rack by interfacing with and securely engaging conventional horizontal Z-brackets of the telecommunications rack. Each cross member includes two downwardly extending tabs which serve to locate the telecommunications rack cable support bracket between two U-shaped brackets of the telecommunications rack. These tabs also provide stress relief for cable bundles passing through the openings within the telecommunications rack cable support bracket and provide a transition surface upon which cable bundles passing through the openings may rest. Cable bundles are secured and routed across the telecommunications rack cable support bracket by cable bundle management devices which are received in openings in each cross members and provide separate cable bundle pathways across the telecommunications rack cable support bracket of the present invention. Thus, in accordance with the present invention, the support member tabs permit the telecommunications rack cable support bracket to be assembled and secured to the telecommunications rack without the need to use special mechanical fasteners and the downwardly extending tabs on the cross members position the telecommunications rack cable support bracket so that access to the U-channels of the telecommunications rack remains unobstructed.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
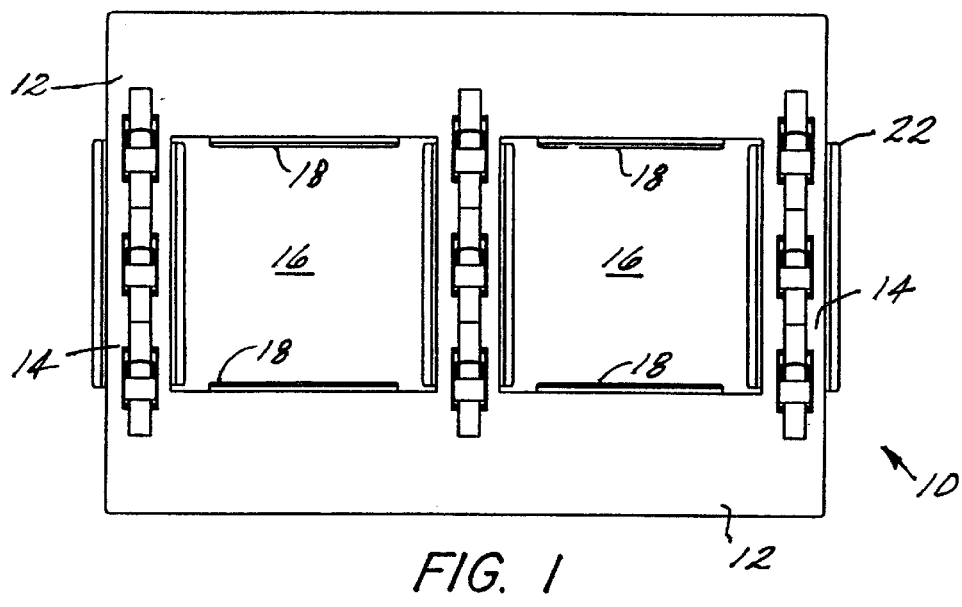
FIG. 1 is a top view of the telecommunications rack cable support bracket.

FIG. 1 is a top view of the telecommunications rack cable support bracket of the present invention generally shown at 10. Telecommunications rack cable support bracket 10 includes two parallel support members 12 and three parallel cross members 14. Cross members 14 are perpendicular to support members 12. Two of the cross members 14 are located towards the ends of support members 12 and a third cross member 14 is located near the center of support members 12. The arrangement of the support members 12 and cross members 14 defines two openings 16 through which cable may be routed. The term cable as used herein is intended to refer to a wide range of products including optical fiber, copper wire, co-axial cable, etc. A plurality of cable bundle management devices 22 are mounted to each cross member 14 as will be described in more detail hereinafter.

Figure 2:
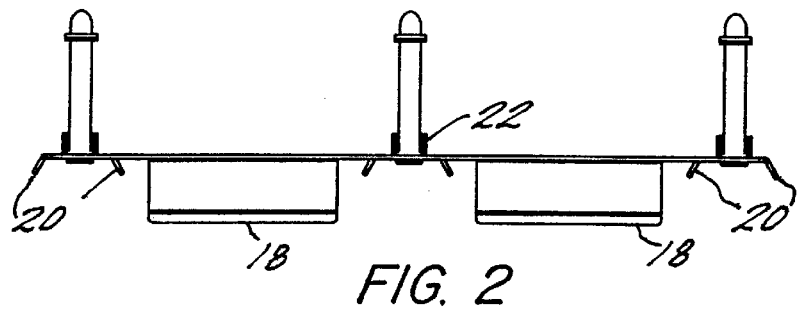
FIG. 2 is a side view of the telecommunications rack cable support bracket.
Figure 3:
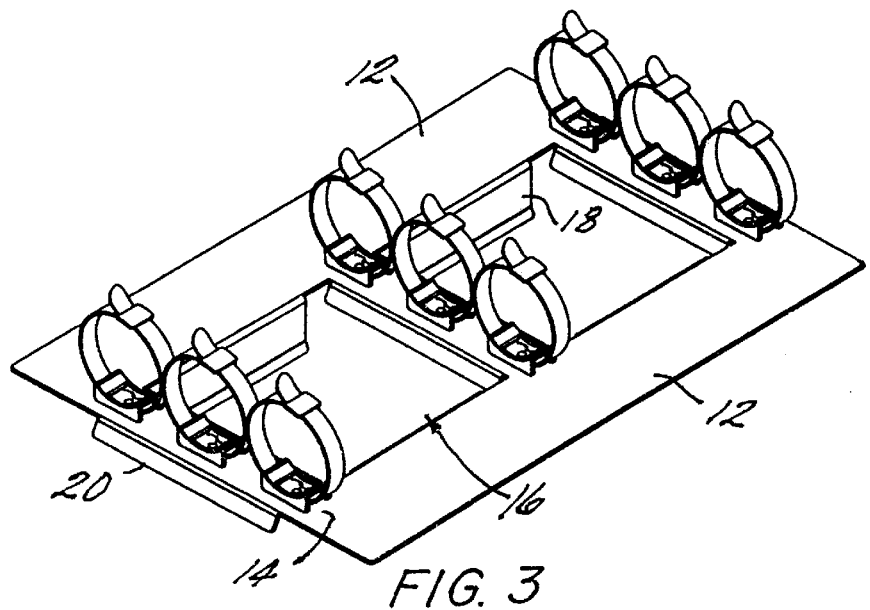
FIG. 3 is a perspective view of the telecommunications rack cable support bracket.

Each support member 12 includes tabs 18 extending away from support member 12 at approximately 90°. Tabs 18 are located on either side of central cross members 14 and thus are positioned in each opening 16. Each cross member 14 also includes two downwardly extending tabs 20 as shown in FIG. 2. Tabs 20 serve to locate the telecommunications rack cable support bracket 10 between two U-shaped brackets 30, shown and described in detail with reference to FIG. 6, and serve as stress relief for cables passing through openings 16. Tabs 20 are downwardly angled with respect to cross member 14 in the range between about 40° to about 80°, with a preferred angle of about 60°. Tabs 20 thus provide a transition surface upon which cables passing through openings 16 may rest. FIG. 3 is a perspective view of telecommunications rack cable support bracket 10 and is self explanatory.

Figure 4:
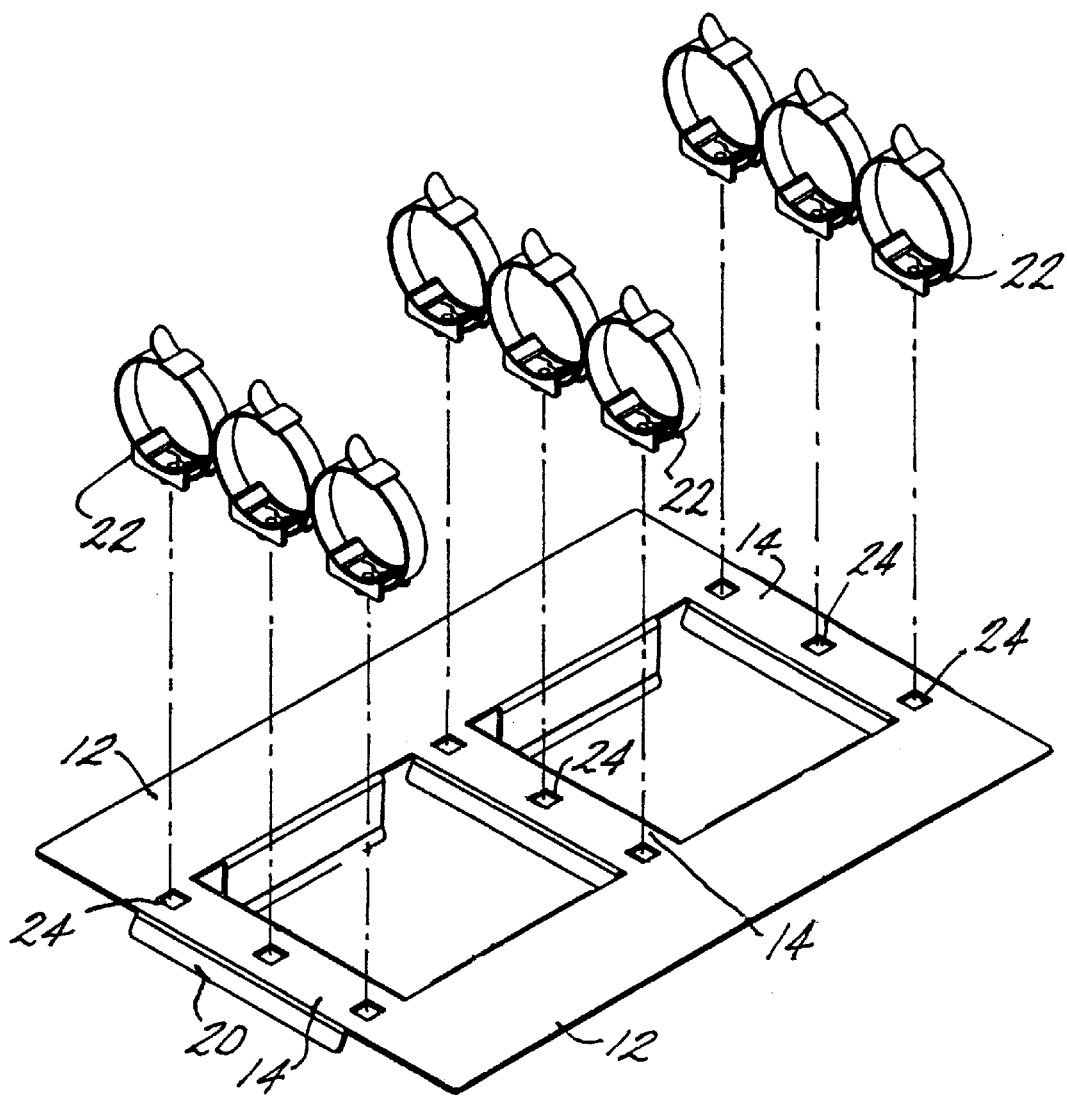
FIG. 4 is an exploded, perspective view of the telecommunications rack cable support bracket.

FIG. 4 is an exploded, perspective view of telecommunications rack cable support bracket 10. As shown in FIG. 4, each cross member 14 includes openings 24 for receiving cable bundle management devices 22. A suitable cable bundle management device 22 is the hook and loop cable manager available from The Siemon Company of Watertown, Connecticut. Although it is within the scope of this invention that other attachable cable bundle management devices 22 may be used with telecommunications rack cable support bracket 10. Preferably, cable bundle management devices 22 are readily detachable from and attachable to telecommunications rack cable support bracket 10 to permit the user the ability to configure the pathway of each cable bundle depending upon the number of cable bundles, the size of the cable bundles, and the specific route of the cable bundles. Cable bundle management devices 22 provide separate cable bundle pathways and permit individual cable bundles to be segregated from other cable bundles and easily routed along the telecommunications rack to a desired location.

Figure 5:
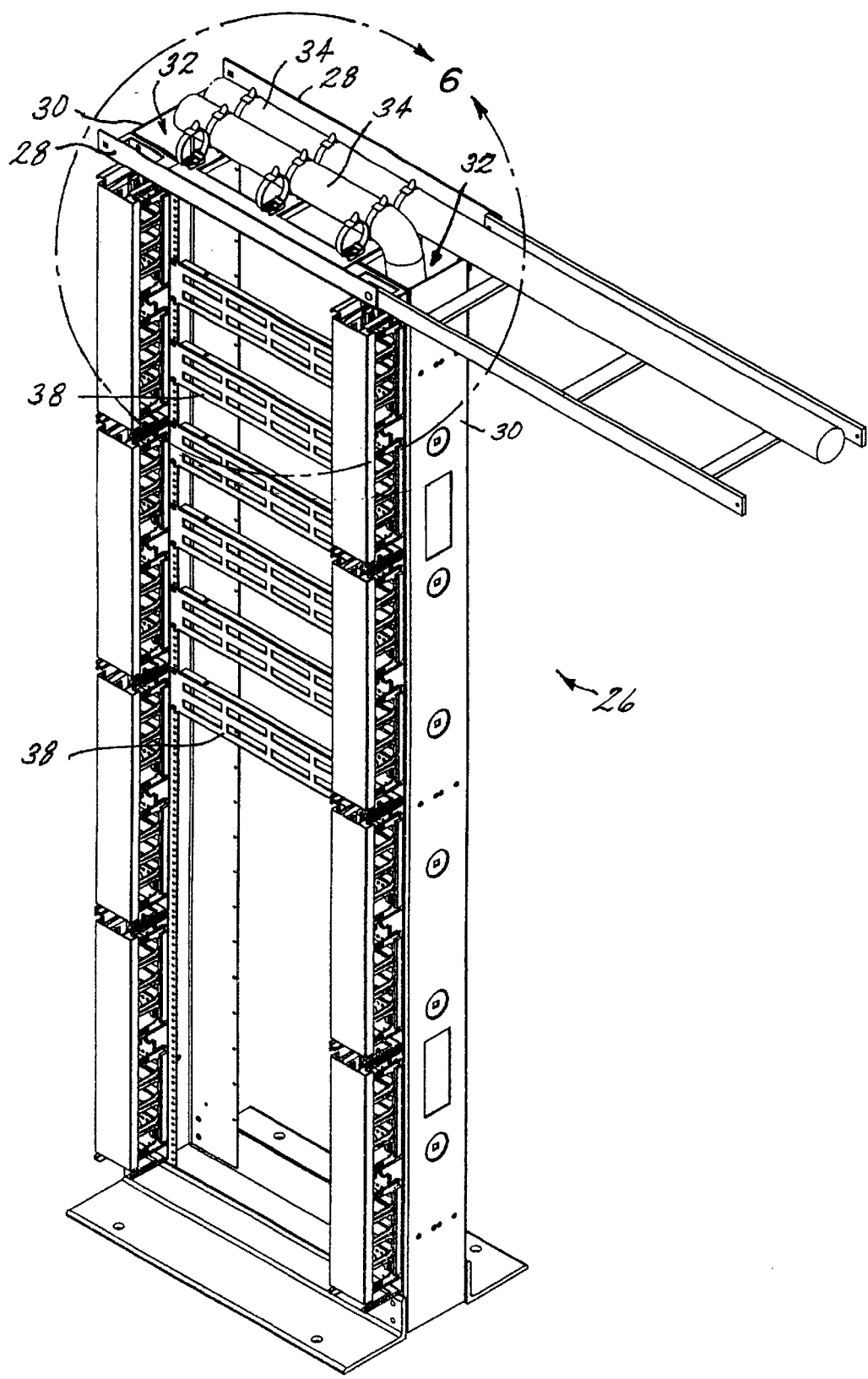
FIG. 5 is a perspective view of a telecommunications rack having the telecommunications rack cable support bracket mounted thereto.

FIG. 5 is a perspective view of a conventional telecommunications rack 26 having telecommunications rack support bracket 10 mounted thereto. Telecommunications rack 26 generally comprises a pair of parallel Z-brackets 28 which form a top component of telecommunications rack 26. Top portion of Z-brackets 28 define a horizontal plane across rack 26 which supports cable bundles and provides a surface for telecommunications rack cable support bracket 10 to be disposed thereon. Telecommunication rack 26 also includes a pair of opposing U-brackets 30 having a channel 32 formed therein, channel 32 commonly being referred to as a U-channel. U-brackets 30 are members which are disposed within a plane vertical to the horizontal plane which contains telecommunications rack cable support bracket 10 mounted across the top of telecommunications rack 26. Cross members 14 are spaced at a sufficient distance from one another so that the cable bundles have full access to U-channels 32 as the cable bundles enter the rack space from above. Thus, U-channel 32 is a vertical channel in which cable bundles 34 are routed upward toward the top of telecommunications rack 26 or downwardly from the top of telecommunications rack 26. U-channel 32 has sufficient dimensions so that a plurality of cable bundles 34 may be routed therethrough.

Telecommunications rack cable support bracket 10 of the present invention is disposed between parallel Z-brackets 28 by positioning tabs 18 in the opening between parallel opposing Z-brackets 28. Secure positioning of telecommunications rack cable support bracket 10 onto telecommunications rack 26 is provided by tabs 18 which interface with and securely engage horizontal Z-brackets 28 of rack 26 by flushly seating against opposing Z-brackets 28, as shown in more detail in FIGS. 6–7. Advantageously, tabs 18 permit telecommunications rack support bracket 10 to be assembled and secured to telecommunications rack 26 without the need to use special mechanical fasteners. Thus, in accordance with the present invention, telecommunications rack support bracket 10 may be easily installed on the top of conventional telecommunication racks 26.

Tabs 20 on the outer cross members 14 serve to centrally locate telecommunications rack cable support bracket 10 across the top of telecommunications rack 26 by positioning angled tabs 20 so that they abut against inner edge 36 of U-channel 32. Importantly, because tabs 20 on outer cross members 14 are disposed against U-channel 32 when telecommunications rack cable support bracket 10 is properly positioned across the top of telecommunications rack 26 and tabs 20 are angled inward toward the center of U-channel 32, tabs 20 provide cable bundle stress concentration relief for cable bundles 34 as cable bundles 34 are routed from U-channel 32 across telecommunications rack cable support bracket 10.

Telecommunications rack 26 also includes patch panels 38 which extend between U-brackets 30 and serve to provide additional structural support for upright telecommunications rack 26.

Generally, top rack cable management systems include a ladder extension 40 secured to Z-brackets 28 by mounting means known in the art, such as by use of carriage bolts or other fasteners. Ladder extension 40 serves as an additional support platform for cable bundles 34 and permits cable bundles 34 to be routed from one telecommunications rack 26 to another or from one telecommunications rack 26 to any desired location. In accordance with the present invention, ladder extension 40 may also be used with telecommunications rack support bracket 10 by coupling the two together by means known in the art. Cross members 14 function to support and secure cable bundles 34 that run across the top of telecommunications rack 26 and when ladder extension 40 is attached to the cable management system, cross members 14 and ladder extension 40 interface so that cable bundles run smoothly across the surfaces of each as the cable bundles are routed in telecommunications rack 26.

Figure 6:
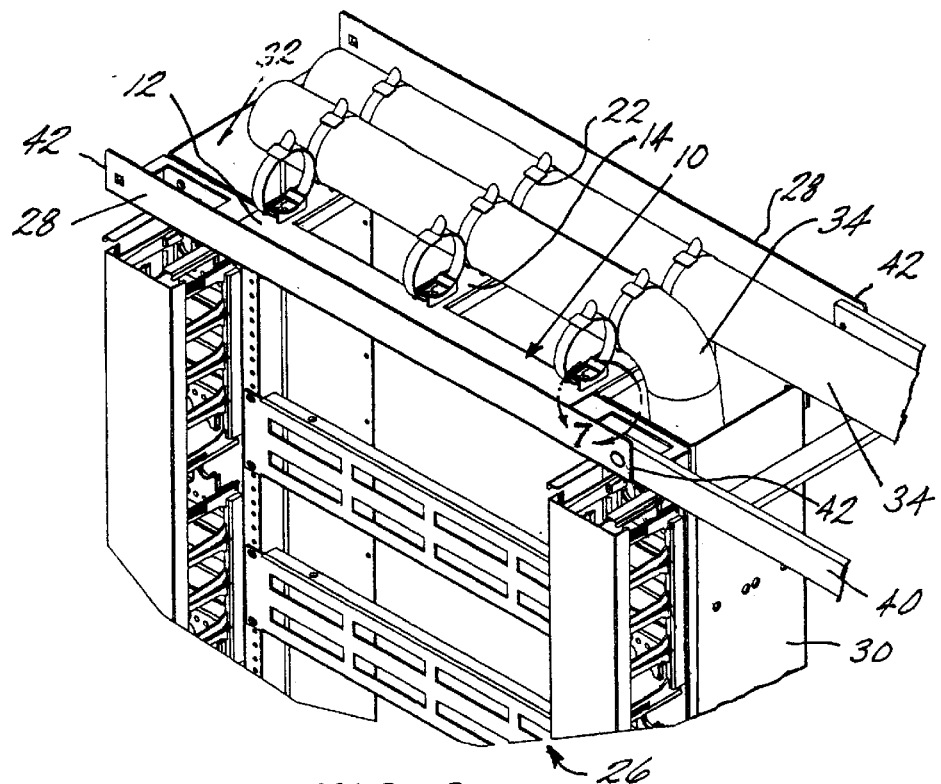
FIG. 6 is an enlarged view of a portion of FIG. 5.

FIG. 6 is an enlarged view of a portion of FIG. 5 illustrating the positioning of telecommunications rack cable support bracket 10 between Z-brackets 28 and between the inner edge 36 of U-brackets 30. Cable bundles 34 are shown disposed within U-channel 32 and extending across telecommunications rack cable support bracket 10. Cable bundles 34 are secured on telecommunication rack cable support bracket 10 by cable bundle management devices 22 disposed within openings 24. Because tabs 20 on outer cross members 14 serve to locate telecommunications rack cable support bracket 10 between U-channels 32, the present invention overcomes the deficiencies of the prior art related to the ladder rungs being positioned over vertical U-channels 32 thereby blocking critical cable pathways to telecommunications rack 26. In addition, openings 16 permit cable bundles to be easily routed therethrough and directed to another locale in telecommunications rack 26 or to a location away from telecommunications rack 26. As shown, telecommunications rack cable support bracket 10 interfaces with the conventional components of an external ladder system by attachment between ladder extension 40 and Z-bracket 28 at external ends 42 of Z-bracket 28. Attachment between these components is by fastening means known in the art, such as by using carriage bolts.

Figure 7:
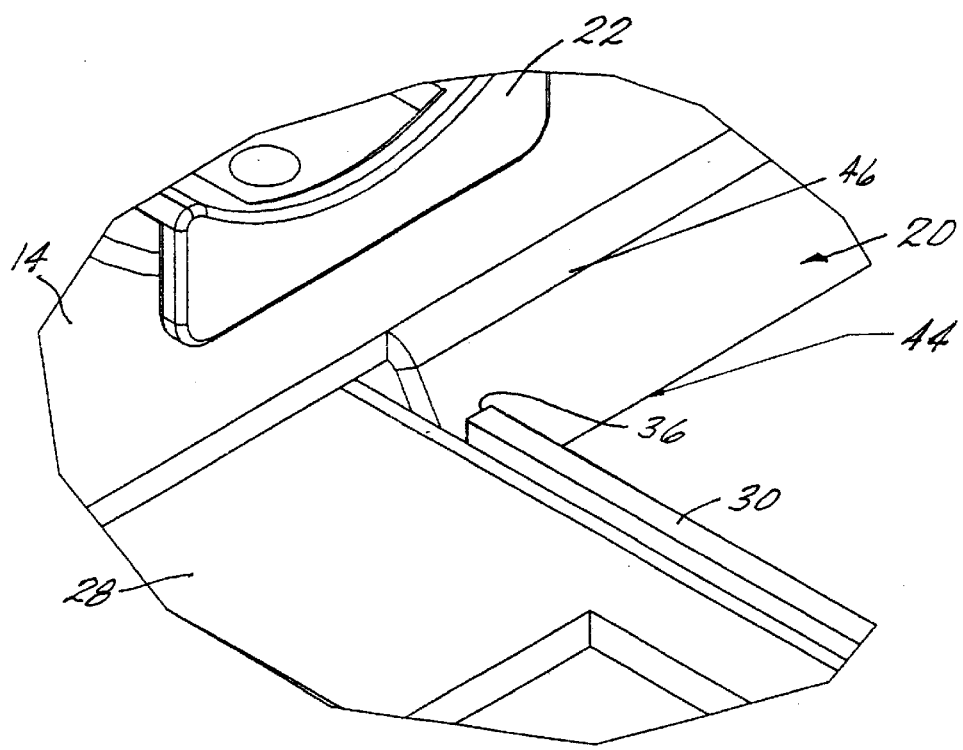
FIG. 7 is an enlarged view of a portion of FIG. 6.

FIG. 7 is an enlarged view of a portion of FIG. 6 illustrating the interference fit between telecommunications rack cable support bracket 10 and the vertical U-channel 32. More specifically, tabs 20 on outer members 14 are shown abutting against inner edge 36 of U-bracket 30. Tabs 20 have an outer edge 44 for contacting inner edge 36 of U-brackets 30 and outer edge 44 serves to centrally locate telecommunications rack cable support bracket 10 on telecommunications rack 26. An inner portion 46 provides stress concentration relief for cable bundles 34 which are routed from U-channel 32 across telecommunications rack cable support bracket 10. This interface between these two components permits telecommunications rack cable support bracket 10 to be centrally positioned on the top of telecommunications rack 26 as described in detail hereinbefore.

Thus, the present invention provides a telecommunications rack cable support bracket with easy mounting/installation capability which does not require the use of special mechanical fasteners for assembly to a telecommunications rack and is less cumbersome and less costly than traditional devices used for the same purpose.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A telecommunications rack cable support bracket for use with a telecommunications rack having a vertical channel for receiving cables, the telecommunications rack cable support bracket comprising:
   a pair of parallel support members;
   a plurality of cross members extending between the parallel support members, the arrangement of the parallel support members and the cross members defines openings through which cable may be routed;
   a guide tab disposed on at least one parallel support member, the guide tab for contacting a structural member of the telecommunications rack; and
   a cross member tab disposed on at least one cross member, the cross member tab being downwardly angled with respect to the cross member, said cross member tab for providing a transition from the telecommunications rack cable support bracket to the vertical channel to provide stress relief for cables.

2. The telecommunications rack cable support bracket of claim 1 wherein one cross member includes a plurality of openings receptive to cable management devices.

3. The telecommunications rack cable support bracket of claim 2 wherein the cable management devices comprise hook and loop cable management devices.

4. The telecommunications rack cable support bracket of claim 2 wherein the cable management devices are readily attachable and detachable from the cross members.

5. The telecommunications rack cable support bracket of claim 1 wherein the cross members are perpendicular to the parallel support brackets.

6. The telecommunications rack cable support bracket of claim 1 wherein the guide tab extends away from the support member at an angle between about 85° and 90°.

7. The telecommunications rack cable support bracket of claim 1 wherein the guide tab extends away from the support member at an angle of about 89°.

8. The telecommunications rack cable support bracket of claim 1 wherein the cross member tab extends downward from the cross member at an angle in the range between about 40° and about 80°.

9. The telecommunications rack cable support bracket of claim 1 wherein the cross member tab extends downward from the cross member at an angle of about 60°.

10. A telecommunications cabling system comprising:
    a telecommunications rack having a pair of horizontal Z-brackets coupled to a U-bracket defining a vertical channel for receiving cables; and,
    a telecommunications rack cable support bracket including:
       a pair of parallel support members;
       a plurality of cross members extending between the parallel support members, the arrangement of the parallel support members and the cross members defines openings through which cable may be routed;
       a guide tab disposed on each parallel support member, the guide tab for engaging and seating against the Z-bracket of the telecommunications rack; and
       a cross member tab downwardly extending from one cross member, the cross member tab for contacting the U-bracket of the telecommunications rack, said cross member tab providing a transition from the telecommunications rack cable support bracket to the vertical channel to provide stress relief for cables.

11. The telecommunications cabling system of claim 10 wherein the cross member tab contacts an inner edge of the U-bracket.

12. The telecommunications cabling system of claim 11 further comprising:
    a telecommunications rack cable support bracket comprising:
       a pair of parallel support members;
       a plurality of cross members extending between the parallel support members, the arrangement of the parallel support members and the cross members defines openings through which cable may be routed;
       a pair of guide tabs disposed on each parallel support member, the guide tabs provided for contacting a Z-bracket of a telecommunications rack;
       a pair of cross member tabs downwardly extending from the cross members, the cross member tabs for contacting a U-bracket of the telecommunications rack, one cross member having a plurality of cross member openings;
    a plurality of cable bundle management devices for reception within the cross member openings; and
    a ladder extension for connection with the Z-bracket of the telecommunications rack.

* * * * *

UNITED STATES PATENT AND TRADEMARK OFFICE
CERTIFICATE OF CORRECTION

PATENT NO. : 6,129,316 Page 1 of 1
DATED : October 10, 2000
INVENTOR(S) : Arthur D. Bauer It is certified that error appears in the above-identified patent and that said Letters Patent is hereby corrected as shown below:

<u>Column 6,</u>
Line 47, delete "a telecommunications rack cable support bracket comprising:
a pair of parallel support members:
a plurality of cross members extending between the parallel support members, the arrangement of the parallel support members and the cross members defines openings through which cable may be routed;
a pair of guide tabs disposed on each parallel support member, the guide tabs provide for contacting a Z-bracket of a telecommunications rack;
a pair of cross member tabs downwardly extending from the cross members, the cross member tabs for contacting a U-bracket of the telecommunications rack, one cross member having a plurality of cross member openings;
a plurality of cable bundle management devices for reception within the cross member opening; and"

Signed and Sealed this

Twenty-third Day of December, 2003

JAMES E. ROGAN
*Director of the United States Patent and Trademark Office*